(12) United States Patent
Palm (10) Patent No.: US 9,628,393 B2
(45) Date of Patent: Apr. 18, 2017

(54) NETWORK USER PRIORITY ASSIGNMENT SYSTEM (75) Inventor: Stephen R. Palm, Irvine, CA (US)

(73) Assignee: Singapore Technologies General IP (Singapore) Pte. Ltd, Singapore (SG)

(*) Notice: Subject to any disclaimer, the term of this patent is extended or adjusted under 35 U.S.C. 154(b) by 2185 days.

(21) Appl. No.: 11/331,606

(22) Filed: Jan. 14, 2006

(65) Prior Publication Data

US 2006/0161663 A1 Jul. 20, 2006

Related U.S. Application Data (60) Provisional application No. 60/593,474, filed on Jan. 17, 2005.

(51) Int. Cl.
H04L 12/851 (2013.01)
H04L 12/54 (2013.01)
H04L 12/801 (2013.01)
H04L 12/911 (2013.01)
H04L 12/927 (2013.01)

(52) U.S. Cl.
CPC .......... H04L 47/24 (2013.01); H04L 12/5695 (2013.01); H04L 47/15 (2013.01); H04L 47/788 (2013.01); H04L 47/803 (2013.01); H04L 47/805 (2013.01); H04L 47/824 (2013.01)

(58) Field of Classification Search
USPC ........ 709/220, 229, 245; 370/395.21, 395.52
See application file for complete search history.

(56) References Cited

U.S. PATENT DOCUMENTS

| | | | |
|---|---|---|---|
| 6,223,222 B1 | 4/2001 | Fijolek et al. | |
| 6,577,628 B1 | 6/2003 | Hejza | |
| 2002/0075875 A1* | 6/2002 | Dravida et al. | 370/395.21 |
| 2005/0013280 A1* | 1/2005 | Buddhikot et al. | 370/349 |
| 2005/0021777 A1* | 1/2005 | Nakao et al. | 709/228 |

* cited by examiner

Primary Examiner — Khaled Kassim
(74) Attorney, Agent, or Firm — Garlick & Markison; Randy W. Lacasse (57) ABSTRACT A network user priority assignment system ("NUPAS") for assigning network user priorities on a network is described. The NUPAS may include a host and a gateway in signal communication with the host. The host may be configured to transmit a request message signal and the gateway may be configured to receive the transmitted request signal and in response generate an acknowledgement signal having a traffic descriptor.

20 Claims, 3 Drawing Sheets

NETWORK USER PRIORITY ASSIGNMENT SYSTEM

CROSS-REFERENCE TO RELATED APPLICATIONS

This application claim priority under Title 35, United States Code Section 119(e), to U.S. Provisional Application Ser. No. 60/593,474, titled "Method for Assigning Network User Priorities," filed Jan. 17, 2005, which is incorporated herein, in its entirety, by this reference.

BACKGROUND OF THE INVENTION

1. Field of the Invention

This invention is related to networks, and in particular to networks incorporating Quality of Service ("QOS") features.

2. Related Art

There is an increasing interest in providing Quality of Service ("QoS") to applications utilized on a network. There have been many approaches in the past for providing QoS for networks including Network User Priority-based QoS (often referred to simply as "priority-based QoS") approaches. In these priority-based QoS networks, an individual application running on the network utilizes one or more priorities of a set of priorities for some of the individual application's data packet transmissions. For example, transmission of real-time voice communication data packets may need a high priority to maintain clear speech, but a transfer of data to print may incur brief pauses that are not perceptible to humans and therefore would not require a high priority. Additionally, each data packet transmitted has a priority. Generally, the individual application may arbitrarily assign a priority for a given transmitted data packet; however, it is often desirable to manage the use of these assigned priorities on the priority-based QoS network so that these priorities are not overused or oversubscribed. Thus there is need for assigning priorities on a priority-based QoS network for different types of data packets on the network without overusing or oversubscribing these priorities.

As a result, systems have been proposed for assigning priorities on these types of networks including, for example, the UPnP™ QoS specifications from the UPnP™ Forum that describe an UPnP™ architecture for QoS. UPnP™ stands for "Universal Plug and Play" and is defined by the documents listed via the Internet at website http://upnp.org. In the UPnP™ QoS architecture, a device or module (implemented in either hardware or software) known as "QoS Policy Holder" is utilized for assigning priorities on the network. Unfortunately, the approach of utilizing an UPnP™ QoS architecture is complex and expensive and a typical network may not have a unique QoS Policy Holder and, therefore, would be unable to have priorities assigned intelligently on the network. Further, some network devices may have more than one application or more than one type of data packets.

Therefore, there is a need for assigning priorities on a priority-based QoS network for different types of data packets on the network without overusing or oversubscribing these priorities. There is also a need for assigning priorities without having to utilize complex network architectures.

SUMMARY

A network user priority assignment system ("NUPAS") is disclosed. The NUPAS may include a host and a configuration server in signal communication with the host. The host may be configured to transmit a request message signal and the configuration server may be configured to receive the transmitted request message signal and in response generate an acknowledgement signal having a traffic descriptor that includes a network user priority value.

In an example of operation, the NUPAS may perform a process that may include transmitting a traffic descriptor using a discover message signal and receiving an offer message signal having a candidate traffic description. The process may also include transmitting a traffic descriptor using a request message signal and receiving an acknowledgement signal having a traffic descriptor including a network user priority value.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

A network user priority assignment system ("NUPAS") is disclosed. The NUPAS may include a host and a configuration server in signal communication with the host. The host may be configured to transmit a request message signal and the configuration server may be configured to receive the transmitted request message signal and in response generate an acknowledgement signal having a traffic descriptor.

In an example of operation, the NUPAS may perform a process that includes transmitting a traffic descriptor using a discover message signal and receiving an offer message signal having a candidate traffic description. The example process also includes transmitting a traffic descriptor using a request message signal and receiving an acknowledgement signal having a traffic descriptor including a network user priority value.

As an example, the configuration server may include a user priority policy module in signal communication with the configuration server. The configuration server may be configured to receive request message signals from the host and the user priority policy module may be configured to generate a network user priority value in response to the configuration server receiving the request message signals. Further the configuration server may include a transmitter that is configured to transmit an acknowledgement signal having a traffic descriptor to the host, wherein the traffic descriptor includes the network user priority value. As an example, the configuration server may be implemented within a gateway device and the user priority policy module may be either incorporated within the configuration server or incorporated within the gateway device external to the configuration server.

The host may also include, as an example, at least one application module and a client module in signal communication with the application module. The client module may be configured to send the request message signal to the gateway and to receive the acknowledgement signal. The application modules may be, for example, a web browser application, voice over internet protocol ("VoIP") application module, video server application module, or print server application module.

In general, the NUPAS may be configured to assign Network User Priorities for applications on devices that may be in signal communication with a heterogeneous network that may have both wired and wireless communication segments. As an example, the NUPAS may be implemented utilizing the Dynamic Host Configuration Protocol ("DHCP").

Overview of DHCP

For the configuration of internet protocol ("IP") addresses and related information, networks commonly utilize DHCP as defined in RFC 2131, which is herein incorporated by reference. For reference, RFC 2131 is described on web page http://www.ietf.org/rfc/rfc2131.txt. The DHCP protocol uses a DHCP Server to respond to requests for IP addresses and other configuration information. The DHCP Server implements a DHCP server function in accordance with the Server requirements as defined by RFC 2131. As an example of operation, network devices wishing to utilize the DHCP Server implement a DHCP client function in accordance with the client requirements as defined by RFC 2131.

The DHCP protocol also allows for the transfer of other information in addition to IP Address information. As an example, the information may be defined and described, as shown in Table 1, in RFC 2132, herein incorporated by reference, or the Internet Assigned Numbers Authority ("IANA") Databases, or the information may be vendor specific.

In an example case defined by RFC 2132, both the DHCP Server and client devices (i.e., network devices) may support various DHCP Options. As an example of operation, when a network device and the DHCP Server communicate across a network utilizing DHCP communication, the network device may provide both its application information and its configuration information to the DHCP Server through DHCP Option codes. As an example, the network device may pass a Client ID utilizing DHCP Option 61, Client Identifier, as defined by RFC 2132. It is appreciated by those skilled in the art that the network device may be also identified by its media access controller ("MAC") address.

Similarly, the DHCP Server may pass information to the network device. As an example, the DHCP Server may pass the system log (log server or "SYSLOG") server IP address to the network device utilizing DHCP Option 7, DHCP OFFER, as defined by RFC 2132. Other example DCHP Options are shown in Table 1.

TABLE 1

Listing of some example DHCP Options as defined by RFC 2132

| Option Number | Option Function | Defaults |
| --- | --- | --- |
| 0 | Pad | N/A |
| 255 | End | N/A |
| 1 | Subnet Mask | 255.255.255.0 |
| 2 | Time Offset | 0 |
| 3 | Router Option | 192.168.0.1 |
| 6 | Domain Name Server | 192.168.0.1 |
| 7 | Log Server | 0.0.0.0 |
| 12 | Host Name | N/A |
| 15 | Domain Name | Null String |
| 23 | Default Time-to-live | 255 |
| 26 | Interface MTU | 1520 |
| 43 | Vendor Specific Information | Vendor Selected |
| 50 | Requested IP Address | N/A |
| 51 | IP Address Lease Time | 60 |
| 54 | Server Identifier | 192.168.0.1 |
| 55 | Parameter Request List | N/A |
| 60 | Vendor Class Identifier | N/A |
| 61 | Client- identifier | N/A |

As described in RFC 2131, a typical DHCP sequence of events includes that upon reset, or other similar action, a network device will issue a DHCP DISCOVER broadcast message to initiate the process of acquiring an IP address lease, providing configuration information, and receiving configuration information from a DCHP Server. In this example, there may be one DHCP Server or multiple DHCP Servers on the network that receive the DHCP DISCOVER message from the network device. In response, each DHCP Server responds with a DHCP OFFER message. The network device then selects a DHCP Server and responds to the selected DHCP Server with a DHCP REQUEST message. In response, the selected DHCP Server responds to the network device with a DHCP ACK (i.e., acknowledgement) which contains committed configuration information. Additionally, in the case of transmission and/or reception errors, RFC 2131 describes exception and error recovery procedures that may be utilized.

It is appreciated by those skilled in the art that DHCP messages may contain other information within the DHCP Options not shown in Table 1 but defined by RFC 2132. In general, DHCP options are of variable-length having a length octet following a tag octet. The value of the length octet does not include two octets specifying the tag and length. The length octet is followed by "length" octets of data. Additionally, Option codes 128 to 254 (decimal) in RFC 2132 are reserved for site-specific options (i.e., the codes do not need to be registered in order to use them) and may be optionally encoded by system designers because they are basically empty codes that have no functionality associated with them and allow the system designers to pass proprietary data. In a DHCP implementation example, the NUPAS may utilize this type of encoding.

In its initial DHCP DISCOVER or DHCP REQUEST message, the network device may provide the DHCP Server with a list of specific parameters that a DHCP Client module in the network device is interested in utilizing. This list is generally known as the "Parameter Request List" Option. This option is used by a DHCP Client to request values for specified configuration parameters. The list of requested parameters is specified as n octets, where each octet is a valid DHCP Option code as defined, for example, in Table 3 shown below.

The network device may also include other DHCP Option fields in the DHCP DISCOVER and DHCP REQUEST messages it broadcasts to the DHCP Servers. These other options may represent "hints" at configuration parameters, descriptions of the client configuration, or requests for other information that is allowed in a DHCP DISCOVER or DHCP REQUEST message.

Implementation of the NUPAS

As an example of an implementation, the NUPAS may be implemented utilizing DCHP. The NUPAS may include a Configuration Server and a Host. The Configuration Server may be a DCHP Server and the Host may be a network device (such as, for example, a personal computer "PC," network storage device, or other network enabled component) that includes a DCHP Client module. The Host may be a network device that utilizes a single IP address per interface. The Host may include one or more application modules that are configured to run different applications and each application module may request and use parameters on the same interface. The Host may then request Network User Priorities for packets of data that it will transmit based on the application module.

In this example, the information sent from the Host to the DHCP Server may include a traffic descriptor. The traffic descriptor may be included in either a transmitted DHCP DISCOVER message signal or DHCP REQUEST message signal. The traffic descriptor may include a Traffic Descriptor ID, suggested Network User Priority for the Traffic Descriptor ID, Traffic Class, Traffic Identifier String, Source port number, Destination IP address, and/or Destination port number. The Traffic Descriptor ID may be a 32-bit integer value that is unique for each set of traffic descriptor on the Host. The Traffic Class may be the traffic class associated with the traffic stream of data from the Host. The Traffic Class may be an enumerated variable that can be assigned to one of the following list of values: network control, streaming control, voice, audio and/or video, data, images, gaming, background, or other similar types of information data. An example list of values is shown in Table 2.

TABLE 2

Example list of Traffic Class values

| Traffic Class Name | Value (hex) |
| --- | --- |
| Network Control | $07_{16}$ |
| Streaming Control | $17_{16}$ |
| Voice | $06_{16}$ |
| AV | $05_{16}$ |
| Audio | $15_{16}$ |
| Gaming | $25_{16}$ |
| Data | $00_{16}$ |
| Images | $10_{16}$ |
| Other | $20_{16}$ |
| Background | $01_{16}$ |
| Printing | $11_{16}$ |

In response to receiving the information from the Host at the DHCP Server, the DHCP Server sends information to the Host that also includes a traffic descriptor, which may be included in either a transmitted DHCP OFFER message signal or DHCP ACK message signal. The traffic descriptor includes a Traffic Descriptor ID (that is the same as the Traffic Descriptor ID sent by the Host) and a Network User Priority for the Traffic Descriptor ID.

In this implementation example, the NUPAS may utilize the format of the DHCP Options to communicate the Network User Priority. As an example, the Vendor Class Identifier Option (i.e., DHCP option 60) defines a network device class and may contain the string "Vendor name" to identify the network device with the actual name of the vendor. The NUPAS may utilize this string (or others) to identify the vendor specific information such as, for example, the string may include the letters "NUP."

The Vendor Specific Information option (i.e., DHCP Option 43) may further identify the type of network device and its capabilities. The option may describe the type of network device that is making the request, the components or applications that are contained in the network device, the network device serial number, and also allows network device specific parameters. Example lists of DHCP Options for network device requests are shown in both Table 3 and Table 4.

TABLE 3

Example list of DHCP Options for network device requests

| DHCP Request Options | Name | Type | Length (octets) |
| --- | --- | --- | --- |
| Option 55 | Parameter Request List | Octets (request Option 43) | 3 |
| Option 60 | "NUP" | String | 3 |
| Option 61 | Device Identifier | String | Variable |
| Option 43 sub-option 1 | Traffic Descriptor ID | 32-bit integer | 4 |
| Option 43 sub-option 2 | Network User Priority | 8-bit integer | 1 |
| Option 43 sub-option 3 | Traffic Class | 8-bit integer | 1 |
| Option 43 sub-option 4 | Traffic Identifier | String | Variable |
| Option 43 sub-option 5 | Source Port | 16-bit integer | 2 |
| Option 43 sub-option 6 | Destination IP Address | 32-bit integer | 4 |
| Option 43 sub-option 7 | Destination Port | 16-bit integer | 2 |

TABLE 4

Example list of DHCP Options for network device requests

| DHCP Request Options | Name | Type | Length (octets) |
| --- | --- | --- | --- |
| Option 60 | "NUP" | String | 3 |
| Option 43 sub-option 1 | Traffic Descriptor ID | 32-bit inetgre | 4 |
| Option 43 sub-option 2 | Network User Priority | 8-bit inetger | 1 |

Implementation Example of a NUPAS Architecture

Figure 1:
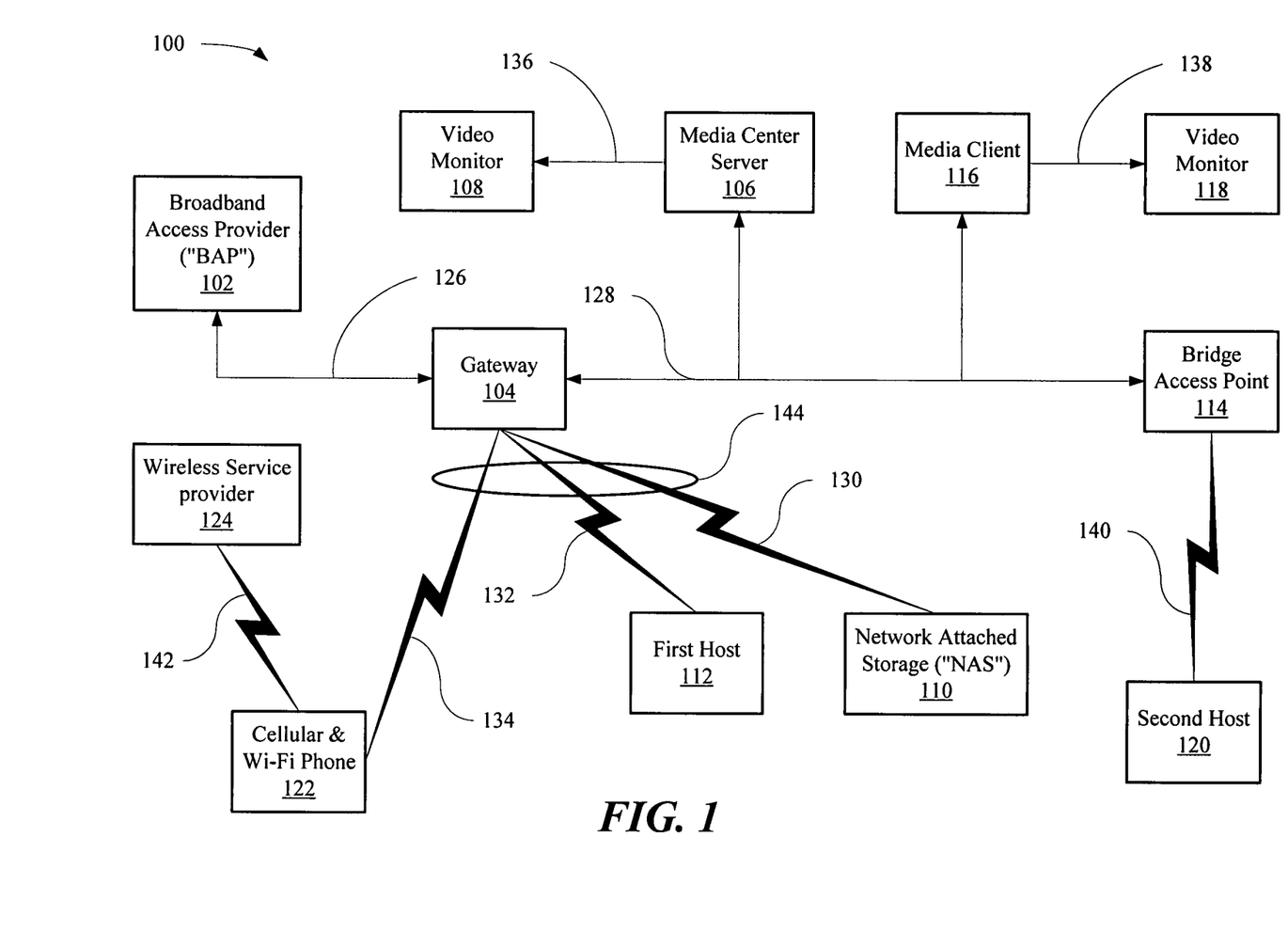
FIG. 1 is an example of an implementation of an example network architecture utilizing a network user priority assignment system ("NUPAS") in accordance with the present invention.

In FIG. 1, an example of an implementation of an example network architecture 100 utilizing a network user priority assigning system ("NUPAS"), in accordance with the present invention, is shown. The network architecture 100 may be a communication network that may include a broadband access provider ("BAP") 102, Configuration Server (which may be incorporated within a gateway device) 104, media center server 106 with a video monitor (such as a television) 108, network attached storage ("NAS") 110, first host (such as a PC Host) 112, bridge access point 114, media client 116 with a video monitor (such as a television) 118, a second host (such as another PC Host) 120, cellular and wireless network phone 122 (where the wireless network may be wireless fidelity "Wi-Fi®," Bluetooth®, or other similar wireless type wireless network), and a wireless service provider 124. The gateway 104 may be in signal communication with the BAP 102, via signal path 126, and in signal communication with Media Center Server 106, bridge access point 114, and media client 116 via signal path 128.

The gateway may also be in signal communication with NAS 110, first host 112, and cellular and wireless network phone 122 via signal paths 130, 132, and 134, respectively. The Media Center Server 106 may be in signal communication with the video monitor 108, via signal path 136, and the Media Client 116 may be in signal communication with video monitor 118 via signal path 138. The bridge access point 114 may be in signal communication with the second Host 120, via signal path 140, and the cellular and wireless network phone 122 may be in signal path with the wireless service provider 124 via signal path 142.

As an example, the signal path 128 may be a wired network that allows the gateway 104, the media center server 106, the media client 116, and the bridge access point 114 to communicate with each other. Similarly, signal paths 130, 132, 134 may define a wireless network A 144 that allows the gateway 104, NAS 110, first Host 112, and Cellular and wireless network Phone 122 to communicate with each other.

In this example, the gateway 104 may be in signal communication, via signal path 126, that may include, for example, an internal or external modem to the BAP 102 that may be, for example, an Internet service provider ("ISP"). The gateway 104 may be located in any premises requiring broadband access or providing network services including, for example, residential and business settings. The second Host 120 may be also in wireless communication with the gateway 104 via the wired network signal path 128, the bridge access point 114, and a second wireless network B via signal path 140. The BAP 102 may include, for example, a campus network, a cable network, a digital subscriber line ("DSL") network, a satellite network, a T1 or T3 synchronous digital network, or any other broadband network technologies. The gateway 104 may provide wired or wireless access to the communication bandwidth of the BAP 102 via the wired network 128, wireless network A 144, and wireless network B 140. As an example, the wired network 128 may be, for example, a Ethernet (e.g., IEEE 802.3) network, a powerline (e.g., HomePlug) Network, a phoneline (e.g., HomePNA) network, a HomePNA over Coax network, a Multimedia over Coax ("MoCA") network, an 802.11 over coax network, or any a wired network based upon any of a variety of other communication technologies. The wireless networks A 144 and B 140 may be, for example, Institute of Electrical and Electronics Engineers ("IEEE") 802.11 networks such as IEEE 802.11a/b/g/n, an 802.15 network, an 802.16 network, a Bluetooth network, or any wireless network based upon a variety of other wireless networking standards.

In this implementation example, the gateway 104 may enable the assignment of Network User Priorities for any of the other network entities (i.e., network devices) in signal communication via the wired network 128 or the wireless networks A 144 and B 140 to the gateway 104. Such setup, configuration, or provisioning may be performed by a pre-configuration with the gateway 104, or by an operator of the broadband network 102, or by an authenticated and authorized third party having access to the gateway 104 via the broadband network 102.

Figure 2:
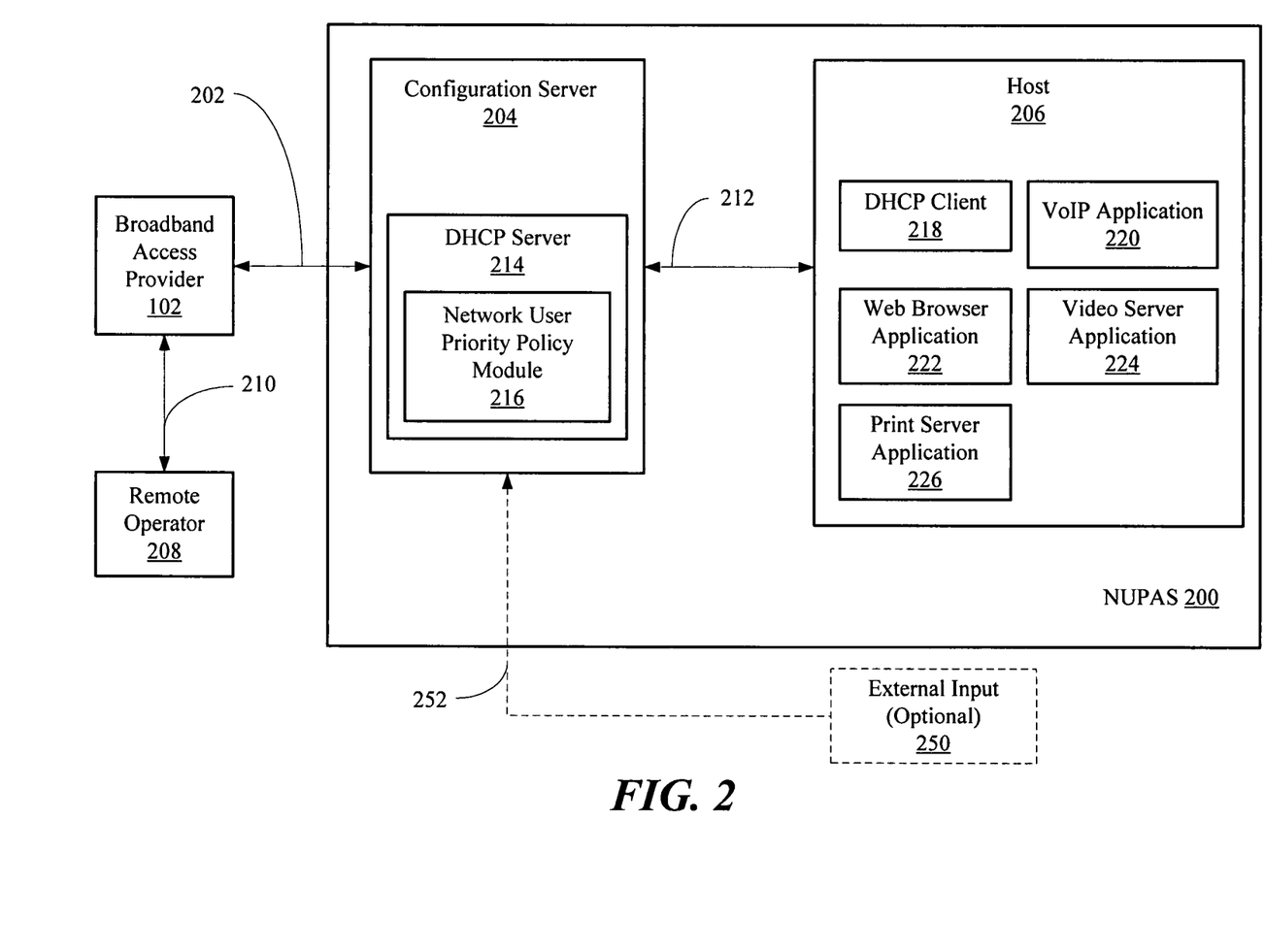
FIG. 2 is a block diagram of an example of an implementation of the NUPAS shown in FIG. 1.

In FIG. 2, a block diagram of an example of an implementation of NUPAS 200 in signal communication with BAP 102 via signal path 202 is shown. The NUPAS 200 may correspond to a portion of the communication network 100 shown in FIG. 1. The NUPAS 200 may include a Configuration Server 204 and a Host 206 that may correspond to the gateway 104 and first host 112 in FIG. 1, respectively. The Host 206 may be a component capable of operation on the network such as, for example, a PC, media server, media client, NAS, or cellular and wireless network phone. The Configuration Server 204 may be in signal communication with a remote operator 208 via the BAP 102 and signal paths 202 and 210. The BAP 102 may be, for example, a campus network, cable network, DSL network, satellite network, or other form of communication network infrastructure. In addition, the Configuration Server 204 may be in signal communication with the Host 206 via a wired and/or wireless communication link along signal path 212.

As an example of an implementation, the Configuration Server 204 may be a gateway device that includes a DHCP Server 214 where the DHCP Server 214 may include a Network User Priority Policy module 216. The Network User Priority module 216 may be optionally part of the DHCP Server 214 or part of the Configuration Server 204 and external to the DHCP Server 214. Similarly, the Host 206 may include a DHCP Client 218, voice over Internet protocol ("VoIP") Application module 220, a Web Browser Application module 222, a Video Server Application module 224, and a Print Server Application module 226.

In an example of operation, an application module on the Host 206 may want to transmit data packets to or via Configuration Server 204 (such as, for example, gateway 104, FIG. 1) using Network User Priorities, as described above. For example, VoIP Application module 220 may wish to transmit VoIP data packets with Network User Priorities. Using the DHCP Client 218, a DHCP DISCOVER message is constructed include the following DHCP Option parameters as defined in Table 5.

TABLE 5

Example DHCP DISCOVER DHCP Options for Host with VoIP Application Request

| DHCP Request Options | Name | Type | Length (octets) | Value |
|---|---|---|---|---|
| Option 55 | Parameter Request List | Octets (request Option 43) | 3 | 55 01 43 |
| Option 60 | Device Class | String | 3 | "NUP" |
| Option 61 | Device Identifier | String | 8 | "BRCM1234" |
| Option 43 sub-option 1 | Traffic Descriptor ID | 32-bit integer | 4 | $10000033_{16}$ |
| Option 43 sub-option 3 | Traffic Class | 8-bit integer | 1 | 0616 |

Similarly, Tables 6, 7, and 8 describe example DHCP Request Options for DHCP OFFER, DHCP REQUEST, and DHCP ACK messages for a Host with a VoIP application request that may be utilized by the NUPAS 200.

TABLE 6

Example DHCP OFFER DHCP Options for Host with a VoIP Application Request

| DHCP Request Options | Name | Type | Length (octets) | Value |
|---|---|---|---|---|
| Option 60 | Device Class | String | 3 | "NUP" |
| Option 43 sub-option 1 | Traffic Descriptor ID | 32-bit integer | 4 | $10000033_{16}$ |
| Option 43 sub-option 2 | Network User Priority | 8-bit integer | 1 | 6 |

TABLE 7

Example DHCP REQUEST DHCP Options for
Host with a VoIP Application Request

| DHCP Request Options | Name | Type | Length (octets) | Value |
|---|---|---|---|---|
| Option 55 | Parameter Request List | Octets (request Option 43) | 3 | 55 01 43 |
| Option 60 | Device Class | String | 3 | "NUP" |
| Option 61 | Device Identifier | String | 8 | "BRCM1234" |
| Option 43 sub-option 1 | Traffic Descriptor ID | 32-bit integer | 4 | $10000033_{16}$ |
| Option 43 sub-option 2 | Network User Priority | 8-bit integer | 1 | 6 |
| Option 43 sub-option 3 | Traffic Class | 8-bit integer | 1 | 0616 |

TABLE 8

Example DHCP ACK DHCP Options for Host
with a VoIP Application Request

| DHCP Request Options | Name | Type | Length (octets) | Value |
|---|---|---|---|---|
| Option 60 | Device Class | String | 3 | "NUP" |
| Option 43 sub-option 1 | Traffic Descriptor ID | 32-bit integer | 4 | $10000033_{16}$ |
| Option 43 sub-option 2 | Network User Priority | 8-bit integer | 1 | 6 |

If the Host 206 already has an IP address from the DHCP Server 214 and has another application module that wants to obtain a Network User Priority, the DHCP Client 218 may be in the DHCP RENEW state and may begin the process with a DHCP REQUEST message. As an example, if the Application module is a Video Server Application module 224, the DHCP sequence may be described in Tables 9 and 10.

TABLE 9

Example DHCP REQUEST DHCP Options for Host with
a Video Server Application Module Request

| DHCP Request Options | Name | Type | Length (octets) | Value |
|---|---|---|---|---|
| Option 55 | Parameter Request List | Octets (request Option 43) | 3 | 55 01 43 |
| Option 60 | Device Class | String | 3 | "NUP" |
| Option 61 | Device Identifier | String | 8 | "BRCM1234" |
| Option 43 sub-option 1 | Traffic Descriptor ID | 32-bit integer | 4 | $10000034_{16}$ |
| Option 43 sub-option 3 | Traffic Class | 8-bit integer | 1 | 0516 |

TABLE 10

Example DHCP ACK DHCP Options for Host with
a Video Server Application Module Request

| DHCP Request Options | Name | Type | Length (octets) | Value |
|---|---|---|---|---|
| Option 60 | Device Class | String | 3 | "NUP" |
| Option 43 sub-option 1 | Traffic Descriptor ID | 32-bit integer | 4 | $10000034_{16}$ |
| Option 43 sub-option 2 | Network User Priority | 8-bit integer | 1 | 5 |

Similar sequences may be utilized for other applications such as the Print Server Application module 226 or the Web Browser Application module 222. Once the Network User Priority value has been received in a DHCP ACK message, data packets associated with that Application module are transmitted with that Network User Priority. If a Network User Priority is not received, data from that application module is transmitted at Best Effort priority which is typically "0."

To select the Network User Priority, the DHCP Server 214 may use one of several methods to evaluate the information in the Traffic Descriptor. For example, the DHCP Server 214 may only examine the Traffic Class and assign the priority based on that Traffic Class. It may use the lower three bits to select the priority. The DHCP Server 214 may look at the destination address or port to assign the priority. The DHCP Server 214 may consult a pre-configured database in Network User Priority Policy module 216. Or the database (not shown) may be configured by the remote operator 208.

As another example, the Configuration Server 204 may be in signal communication with an optional external input 250 via signal path 252. The optional external input 250 may be a device external to the NUPAS 200, a user, or the remote operator 208. In general, the external input 250 may be an input that directs the Network User Priority Policy module 216 to assign a specific network user priority value to a given application module based on some, or all, of the information that may be contained in a traffic descriptor. An example of the optional external input 250 may include a mechanical switch located on the gateway device that assigns higher priorities to certain types of data. For example, the switch may selectively assign higher priority values for VoIP applications or Video Server applications than print server applications. The optional external input 250 may also be a device that monitors the type of data traffic on the network and in response directs the Network User Priority Policy module 216 to assign network user priority values to the Host 206 based on the type of data analyzed by the optional external input 250. Similarly, the external input 250 may be a user located at the remote operator 208 that is capable of modifying the network user priority values produced by the Network User Priority Policy module 216.

Figure 3:
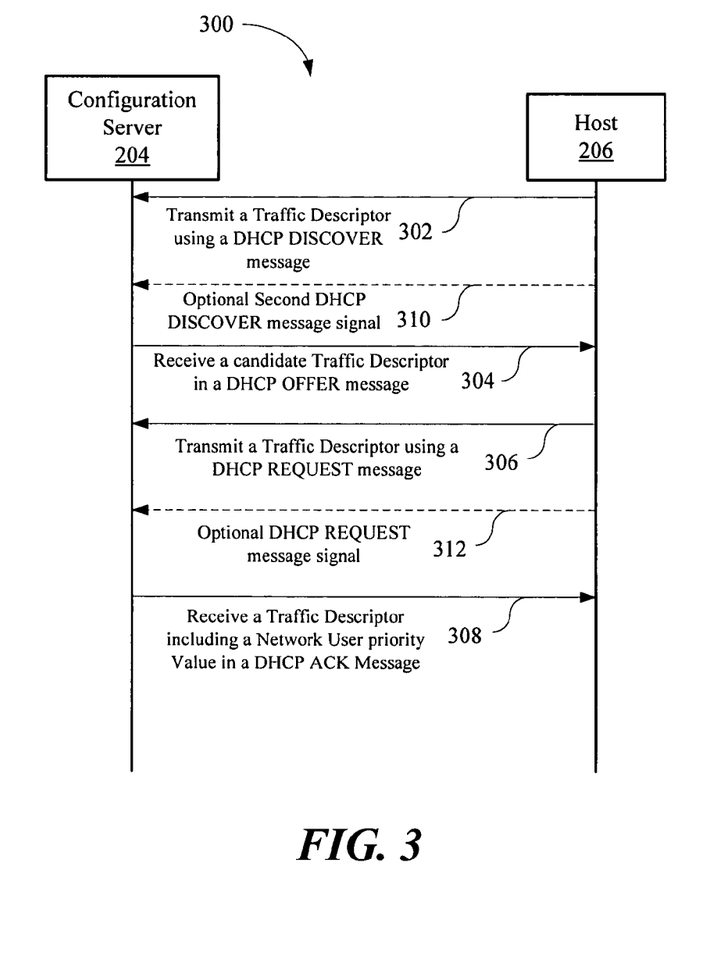
FIG. 3 is a signal flow diagram illustrating an example of operation of the NUPAS shown in FIG. 2.

In FIG. 3, a signal flow diagram 300 illustrating an example of operation of the NUPAS 200, in FIG. 2, is shown. The NUPAS 200 performs a process that assigns a Network User Priority in a heterogeneous network. The process begins when the Host 206 transmits a traffic descriptor using a DHCP DISCOVER message signal 302 to the Configuration Server 204. The Configuration Server 204 receives the DHCP DISCOVER message signal and in response produces a candidate Traffic Descriptor in a DHCP OFFER message signal and transmits 304 the DHCP OFFER message signal to the Host 206. The Host 206 receives the candidate Traffic Descriptor and in response transmits a second Traffic Descriptor to the Configuration Server 204 using a DHCP REQUEST message signal 306. The Configuration Server 204 receives the DHCP REQUEST message signal and in response produces and transmits to the Host 206 a DHCP ACK signal 308 having traffic descriptor that includes a network user priority value. The host receives the DHCP ACK message signal and the process ends.

The example process may also include a procedure for exception and error recovery that may be optionally similar to procedures described in RFC 2131. As an example in the case of exception and error recovery, if the Host 206 transmits a traffic descriptor using a DHCP DISCOVER message signal 302 to the Configuration Server 204 but does not receive a DHCP OFFER message signal, the Host 206 may again transmit a traffic descriptor using an optional second DHCP DISCOVER message signal 310 to the Configuration Server 204. If the Configuration Server 204 did not receive the original DHCP DISCOVER message signal 302, the Host 206 may continue to transmit traffic descriptors using an optional DHCP DISCOVER message signals (not shown) to the Configuration Server 204 until the Configuration Server 204 receives the DHCP DISCOVER message signals and in response produces the candidate Traffic Descriptor in a DHCP OFFER message signal and transmits 304 the DHCP OFFER message signal to the Host 206. If the Configuration Server 204 did receive the original DHCP DISCOVER message signal 302 but the Host 206 did not receive the candidate Traffic Descriptor in a DHCP OFFER message signal transmitted by the Configuration Server 204, the Host 206 may continue to transmit traffic descriptors using optional DHCP DISCOVER message signals (not shown) to the Configuration Server 204 until the Configuration Server 204 receives the DHCP DISCOVER message signals and in response produces the candidate Traffic Descriptor in a DHCP OFFER message signal and transmits 304 the DHCP OFFER message signal to the Host 206.

Similarly, if the Host 206 transmits the DHCP REQUEST message signal 306 to the Configuration Server 204 but does not receive a DHCP ACK signal 308 having a traffic descriptor that includes a network user priority value, the Host 206 may again transmit a traffic descriptor using an optional second DHCP REQUEST message signal 312 to the Configuration Server 204. If the Configuration Server 204 did not receive the original DHCP REQUEST message signal 306, the Host 206 may continue to transmit optional DHCP REQUEST message signals (not shown) to the Configuration Server 204 until the Configuration Server 204 receives the DHCP REQUEST message signals and in response produces the DHCP ACK signal 308 having traffic descriptor that includes a network user priority value to the Host 206. If the Configuration Server 204 did receive the original DHCP REQUEST message signal 306 but the Host 206 did not receive the DHCP ACK signal 308 having traffic descriptor that includes a network user priority value transmitted by the Configuration Server 204, the Host 206 may continue to transmit optional DHCP REQUEST message signals (not shown) to the Configuration Server 204 until the Configuration Server 204 receives the optional DHCP REQUEST message signals (not shown) and in response produces the DHCP ACK signal 308 having traffic descriptor that includes a network user priority value to the Host 206.

Additionally, if the Configuration Server 204 transmits a DHCP OFFER message signal 304 to the Host 206 but does not receive a DHCP request message 306, the Configuration Server 204 may transmit optional additional DHCP OFFER message signals (not shown) to the Host 206 until the Configuration Server 204 receives the DHCP REQUEST message signal 306. The Configuration Server 204 then responds by transmitting the DHCP ACK message signal 308.

Persons skilled in the art will understand and appreciate, that one or more processes, sub-processes, or process steps described may be performed by hardware and/or software. Additionally, the process described above may be implemented completely in software that would be executed within a microprocessor, general-purpose processor, combination of processors, digital signal processor ("DSP"), and/or application specific integrated circuit ("ASIC"). If the process is performed by software, the software may reside optionally in software memory (not shown) in the gateway 104, first host 112, second host 120, remote operator 208, an external processor (not shown) in signal communication with the NUPAS 200, the optional external input 250, or combination. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium", "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

It will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:

1. A method for assigning network user priorities on a network having a Configuration Server and a Host, the method comprising:
   receiving a first traffic descriptor as part of a process of acquiring a network address for the Host, the first traffic descriptor generated by the Host and included in a discover message signal generated by the Host, the first traffic descriptor including two or more options from the group consisting of Traffic Descriptor ID, Class, suggested Network User Priority for the Traffic Descriptor ID, Traffic Identifier String, Source Port Number, Destination IP Address, and Destination Port Number;

transmitting a candidate traffic descriptor as part of the process of acquiring a network address for the Host, the candidate traffic descriptor included in a first offer message signal;

receiving a second traffic descriptor as part of the process of acquiring a network address for the Host, the second traffic descriptor included in a request message signal; and transmitting a third traffic descriptor, including at least a network user priority value, as part of the process of acquiring a network address for the Host, the third traffic descriptor included in an acknowledgement signal.

2. The method of claim 1, wherein the third traffic descriptor further includes one or more options from a group consisting of Traffic Descriptor ID, suggested Network User Priority for the Traffic Descriptor ID, Class, Traffic Identifier String, Source port number, Destination IP address, and Destination port number.

3. The method of claim 2, wherein the Traffic Descriptor ID of the first traffic descriptor has a first value that is equal to a second value of the Traffic Descriptor ID of the third traffic descriptor.

4. The method of claim 3, wherein the third traffic descriptor further includes an internet protocol ("IP") address for the Host.

5. The method of claim 4, wherein the first traffic descriptor further includes application information related to an application module selected from the group consisting of voice-over Internet protocol ("VoIP") application module, a Web browser application module, a video server application module, and print server application module.

6. The method of claim 1, further including transmitting at least another offer message signal after transmitting the first offer message signal.

7. A method for assigning network user priorities on a network having a Configuration Server and a Host, the method comprising:

transmitting a first traffic descriptor as part of a process of acquiring a network address for the Host, the first traffic descriptor generated by the Host and included in a first discover message signal generated by the Host, the first traffic descriptor including two or more options from the group consisting of Traffic Descriptor ID, Class, suggested Network User Priority for the Traffic Descriptor ID, Traffic Identifier String, Source Port Number, Destination IP Address, and Destination Port Number;

receiving a candidate traffic descriptor as part of a process of acquiring a network address for the Host, the candidate traffic descriptor included in an offer message signal;

transmitting a second traffic descriptor as part of a process of acquiring a network address for the Host, the second traffic descriptor included in a first request message signal; and receiving a third traffic descriptor, including at least a network user priority value, as part of a process of acquiring a network address for the Host, the third traffic descriptor included in an acknowledgement signal.

8. The method of claim 7, wherein the third traffic descriptor further includes one or more options from a group consisting of Traffic Descriptor ID, suggested Network User Priority for the Traffic Descriptor ID, Class, Traffic Identifier String, Source port number, Destination IP address, and Destination port number.

9. The method of claim 8, wherein the Traffic Descriptor ID of the first traffic descriptor has a first value that is equal to a second value of the Traffic Descriptor ID of the third traffic descriptor.

10. The method of claim 9, wherein the third traffic descriptor further includes an internet protocol ("IP") address for the Host.

11. The method of claim 10, wherein the first traffic descriptor further includes application information related to an application module selected from the group consisting of voice-over Internet protocol ("VoIP") application module, a Web browser application module, a video server application module, and print server application module.

12. The method of claim 7, further including transmitting at least another discover message signal after transmitting the first discover message signal.

13. The method of claim 12, further including transmitting at least another request message signal after transmitting the first request message signal.

14. The method of claim 7, further including transmitting at least another request message signal after transmitting the first request message signal.

15. A Configuration Server in signal communication with a Host, the Configuration Server comprising:

a Server configured to receive a first traffic descriptor as part of a process of acquiring a network address for the Host, the first traffic descriptor generated by the Host and included in a first discover message signal generated by the Host, wherein the first traffic descriptor includes two or more options selected from a group consisting of Traffic Descriptor ID, suggested Network User Priority for the Traffic Descriptor ID, Traffic Identifier String, Source port number, Destination IP address, and Destination port number;

the Server further configured to receive a request message signal from the Host; and a User Priority Policy module in signal communication with the Server, the User Priority Policy module configured to generate a network user priority value in response to the Server receiving the first traffic descriptor with two or more options.

16. The Configuration Server of claim 15, further including a transmitter configured to transmit an acknowledgement signal having a second traffic descriptor, wherein the second traffic descriptor includes the network user priority value.

17. The Configuration Server of claim 16, wherein the second traffic descriptor further includes second information selected from a group consisting of Traffic Descriptor ID, suggested Network User Priority for the Traffic Descriptor ID, Class, Traffic Identifier String, Source port number, Destination IP address, and Destination port number.

18. The Configuration Server of claim 17, wherein the Traffic Descriptor ID of the second traffic descriptor has a second value that is equal to a first value of the Traffic Descriptor ID of the first traffic descriptor.

19. The Configuration Server of claim 18, wherein the Server is a dynamic Host configuration protocol ("DHCP") Server.

20. The Configuration Server of claim 19, wherein the Configuration Server is part of a gateway device.

* * * * *

UNITED STATES PATENT AND TRADEMARK OFFICE
CERTIFICATE OF CORRECTION

PATENT NO. : 9,628,393 B2  
APPLICATION NO. : 11/331606  
DATED : April 18, 2017  
INVENTOR(S) : Stephen R. Palm Page 1 of 1

It is certified that error appears in the above-identified patent and that said Letters Patent is hereby corrected as shown below:

On the Title Page

Item (73) reads:  
Singapore Technologies General IP (Singapore) Pte. Ltd,

Should read:  
Avago Technologies General IP (Singapore) Pte. Ltd., Singapore (SG)

Signed and Sealed this  
Thirtieth Day of May, 2017

Michelle K. Lee  
*Director of the United States Patent and Trademark Office*